June 20, 1961 G. H. MOREY 2,989,613
WRAP-AROUND HEATER
Filed Jan. 29, 1960
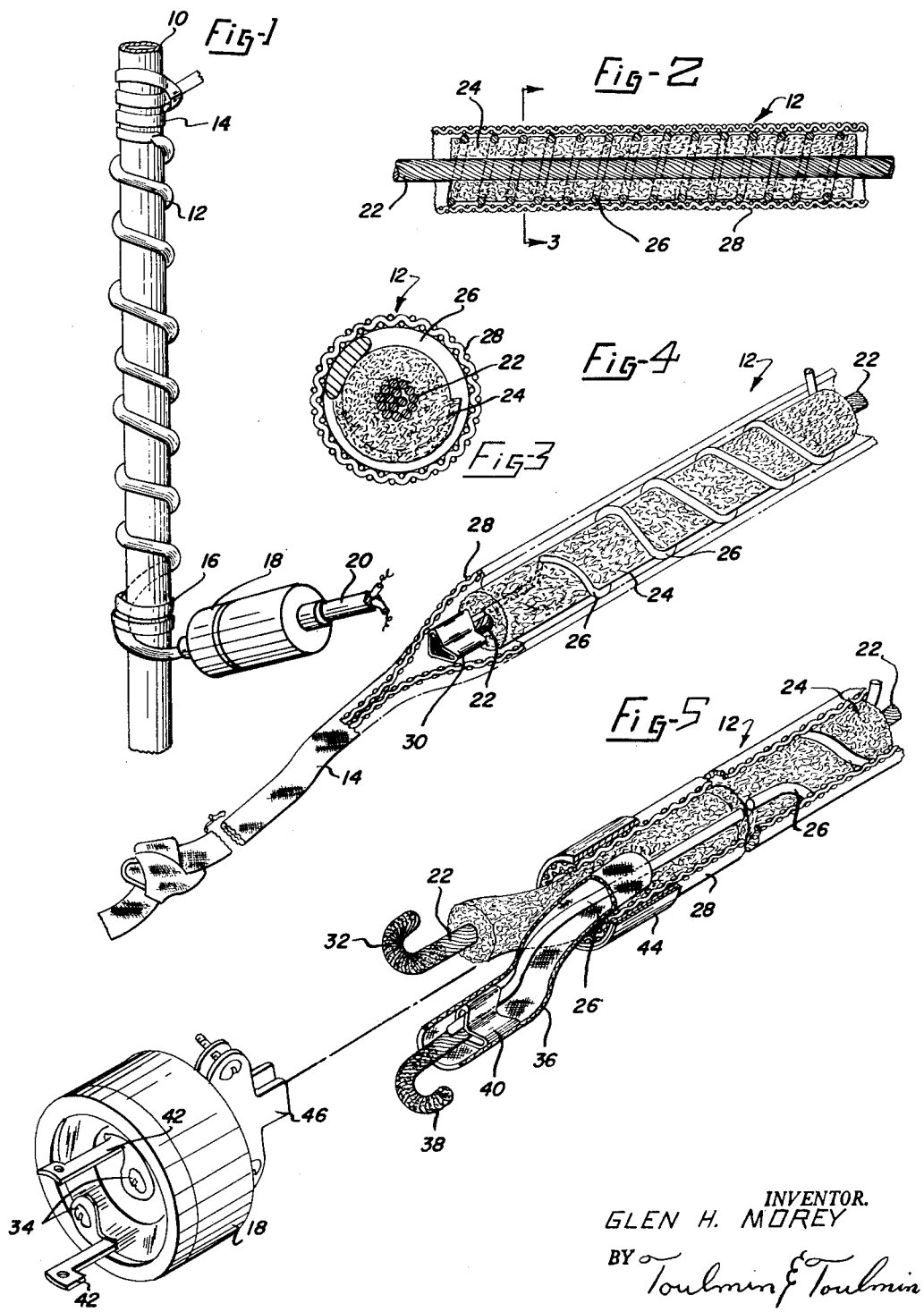
INVENTOR.
GLEN H. MOREY
BY Toulmin & Toulmin
ATTORNEY 2,989,613
Patented June 20, 1961

2,989,613
WRAP-AROUND HEATER
Glen H. Morey, Terre Haute, Ind., assignor to Linton-Summit Coal Company, Inc., Terre Haute, Ind., a corporation of Indiana
Filed Jan. 29, 1960, Ser. No. 5,380
6 Claims. (Cl. 219—46)

This invention relates to a method and apparatus for heating and is particularly concerned with a wrap-around electric heater.

Wrap-around heaters are widely used for warming or thawing pipes and the like and are also widely used in laboratories for heating equipment or for maintaining pipes or tubing at a desired temperature for the carrying out of chemical reactions or other work.

Electric resistance heaters of this nature many times take the form of tapes having a resistance wire therein in a zig-zag form or in the form of a ribbon and usually the heating cord or tapes has electric terminals at each end. The provision of an electric terminal at each end is particularly objectionable because there is a possibility of disconnecting one end of the heating cord whereupon the other end of the cord will remain energized thus introducing the possibility of injury to personnel.

Usually, space limitations prevent the installation of a return wire on either the inside or outside of the cord, particularly where the cord is a small unit.

Having the foregoing in mind, it is a primary object of the present invention to provide an improved heating cord of the nature referred to in which the drawbacks referred to above are eliminated.

A particular object of this invention is the provision of an electric resistance heating cord in which both terminals are located at one end of the cord without there being any problem of a bulky return wire either inside or outside of the cord.

A further object of this invention is the provision of a heating cord of the nature referred to in which the resistance wire in the cord is so situated therein that sharp bends and the like are avoided while the cord still retains its full measure of flexibility.

These and other objects and advantages will become more apparent upon reference to the drawings in which:

FIGURE 1 is a perspective view showing a heating cord according to the present invention applied to a tube or pipe or the like which is to be heated thereby;

FIGURE 2 is a longitudinal sectional view through the cord showing the manner in which the resistance heating wire and the return lead, and the electrical insulation are related to each other;

FIGURE 3 is an enlarged cross sectional view taken through the heating cord as indicated by line 3—3 on FIGURE 2;

FIGURE 4 is a perspective view showing one end of the cord at somewhat enlarged scale and with the outer insulating sheath of the cord in section to show the resistance heating wire therein and the heat resistant core on which the wire is wound and the connection of the resistance wire to the return lead which is located inside the core; and FIGURE 5 is a perspective view similar to FIGURE 4 but showing the opposite end of the tape and illustrating the manner in which the return lead is arranged for connection with an electric plug and also showing how the resistance wire is arranged for connection with the plug.

Referring to the drawings somewhat more in detail, in FIGURE 1 there is a pipe or conduit or the like 10 which is to be maintained at a predetermined temperature or which is to be warmed for some reason. Wrapped around the member 10 in a spiral fashion is the heating cord 12 according to this invention. Toward the top of FIGURE 1, the heating cord comprises a flexible ribbon-like end part 14 which is a projection extending from the end of the outer sheath of the cord which is availed of for securing the end of the cord in place by wrapping around the member 10 and being tied thereto. At the other end of the cord a tie 16 may be employed to hold the cord in place.

A plug 18 on the one end of the cord is utilized for effecting connection of the cord with a supply cable 20 and which supplies electrical energy to the heating cord.

Turning now to the construction of the heating cord, this will best be seen in FIGURES 2 through 5. The cord according to this invention includes a central wire 22 which is covered with a layer 24 of a high temperature resistant material such as asbestos, glass or quartz fibers or the like.

This material may be woven or braided about the circular wire or it may be placed thereabout in any other manner to insure that the covering will be retained about the circular wire and of substantially uniform thickness.

About the covering 24 there is wound the relatively fine wire 26 which is resistance wire so that upon passing an electric current therethrough heat will be developed. This wire will be round in cross section or may be flat and ribbon-like.

Over the outside of the combination of the circular wire 22, covering 24 and resistance wire 26 there is placed a woven or braided sheath 28 which is preferably of temperature resistant glass or quartz fibers but which may also be made of asbestos and may comprise a simple braided or woven sheath or it may be impregnated with a high temperature resistant plastic such as the high temperature silicone rubbers or the like where the temperature at which the cord is to operate does not exceed the temperature at which the impregnant or outer plastic coating would commence to deteriorate.

The previously mentioned tie portion 14 on the end of the heating cord opposite plug 18 is a portion of the sheath 28 which extends beyond the end of the core portion of the heating cord.

The central center wire 22 is utilized as a return wire so that at one end this wire is connected with plug 18 and at its other end is connected with the resistance wire 26. This wire thus serves not only as a return wire inside the cord which does not make the cord bulky or involve any problems of this nature but also serves to give the cord body and to add strength to the cord so that the core of the cord is fairly solid and inextensible whereby the cord can withstand considerable abuse. At the same time the wire 22 does not detract from the flexibility of the cord.

As will be best seen in FIGURE 4, the resistance wire 26 is connected with the end of the core wire 22 by a metal sleeve 30 into which the ends of two wires extend and then is crimped down tight against the wires. Other means of effecting this connection will be evident to those skilled in the art.

At the opposite end of the tape the wire 22 is brought out from the end of the core and the end portion thereof may be then bent into a hook form as at 32 for attachment to one of the prongs of plug 18 by screw 34. The corresponding end of resistance wire 26 is brought out from the end of sheath 28 through a smaller high temperature resistant insulating sleeve 36 and within the sleeve is connected with a short lead 38 as by a crimped sleeve 40 of the same nature as the previously described crimped sleeve 30. The lead 38 is hooked in the same manner as the end of wire 22 so that connection thereof can be made with the other prong of plug 18 by screw 42.

The end of the sheath 28 adjacent plug 18 may advantageously be provided with one or more wraps of a fairly heavy fabric 44 which may have adhesive thereon and which serves to permit the end of the heating cord to be tightly clamped within the clamp portion 46 forming a part of plug 18.

By this arrangement any tensile loads on the cord are transmitted directly to the central wire 22 or if the load is solely on the sheath 28 the sheath is prevented from separating from the plug 18.

A heating cord according to the present invention is thus compact, has only a single electrical connector thereon at one end, is highly flexible, and can withstand an extreme amount of physical abuse.

It will be understood that this invention is susceptible to modification in order to adapt it to different usages and conditions; and, accordingly, it is desired to comprehend such modifications within this invention as may fall within the scope of the appended claims.

I claim:

1. An electric heating cord comprising; a flexible stranded wire of substantial size, a cylindrical body of heat resistant electrical insulating material surrounding said core wire and extending therealong, said body of insulating material being flexible, an electric resistance wire substantially smaller in cross section than said core wire wound spirally about said body of insulating material from one end thereof to the other, means for clamping the core wire and resistance wire together at one end so the core wire can serve as a return path for electric current flowing through the resistance wire, a conductive lead of substantial cross-section clamped to said electric resistance wire at one end, a two-prong electrical connector at the other end of said wires and having one prong connected with each of said wires, and a flexible sheath of heat resistant electrical insulating material attached to said cylindrical body of heat resistant material and extending therefrom along the outside of said body of insulating material and the resistance wire thereon to beyond the end of the point of connection of said wires with each other.

2. An electric heating cord comprising; a flexible stranded wire of substantial size, a cylindrical body of heat resistant electrical insulating material surrounding said core wire and extending therealong, said body of insulating material being flexible, an electric resistance wire substantially smaller in cross section than said core wire wound spirally about said body of insulating material from one end thereof to the other, means clamping the core wire and resistance wire together at one end so the core wire can serve as a return path for electric current flowing through the resistance wire, a two-prong electrical connector at the other end of said wires having one prong connected with each of said wires, and a flexible sheath of heat resistant electrical insulating material surrounding said body of insulating material and attached to said cylindrical body of heat resistant material and extending therefrom along the outside of said body of insulating material and the resistance wire thereon to beyond the end of the point of connection of said wires with each other, the material of said body of insulating material being selected from the class of refractory fibers that includes asbestos, quartz and glass, and means for clamping said flexible sheath of insulating material and core securely together and to said connector.

3. An electric heating cord comprising; a flexible stranded wire of substantial size, a cylindrical body of heat resistant electrical insulating material surrounding said core wire and extending therealong, said body of insulating material being flexible, an electric resistance wire substantially smaller in cross section than said core wire wound spirally about said body of insulating material from one end thereof to the other, means clamping the core wire and resistance wire together at one end so the core wire can serve as a return path for electric current flowing through the resistance wire, a two-prong electrical connector at the other end of said wires having one prong connected with each of said wires, a flexible sheath of heat resistant electrical insulating material surrounding said body of insulating material and attached to said cylindrical body of heat resistant material and extending therefrom along the outside of said body of insulating material and the resistance wire thereon to beyond the end of the point of connection of said wires with each other, said sheath comprising a textile material made of fibers selected from the class of refractory fibers that includes asbestos, quartz and glass, and means for clamping said sheath of heat resistant electrical insulating material and said core wire securely together and to said connector.

4. An electric heating cord comprising; an elongated cylindrical body of heat resistant electrical insulating material, said body being flexible and resilient, an electric resistance wire wound spirally about said body of insulating material from one end thereof to the other and slightly imbedded in the said material so as to be supported by the material against shifting thereon, a central core wire of good electrical conductivity and of substantially greater cross sectional area than said resistance wire extending through said body of insulating material from end to end, means clamping the wires together at one end of said body of insulating material, a conductive lead of substantial cross section clamped to the resistance wire at the opposite end, an electrical connector having two terminals, means connecting each of said core wire and the lead to a different one of said terminals, a flexible sheath of heat resistant electrical insulating material surrounding said body of insulating material and extending from said connector to beyond the opposite end of said body of insulating material, and said connector comprising a clamp clamping said sheath and said body of insulating material and core wire tightly together and to said connector.

5. An electric heating cord comprising; an elongated cylindrical body of heat resistant electrical insulating material, said body being flexible and resilient, an electric resistance wire wound spirally about said body of insulating material from one end thereof to the other and slightly imbedded in the said material so as to be supported by the material against shifting thereon, a central core wire of good electrical conductivity and of substantially greater cross sectional area than said resistance wire extending through said body of insulating material from end to end, means clamping the wires together at one end of said body of insulating material, a conductive lead of substantial cross section clamped to the resistance wire at the opposite end, an electrical connector having two terminals, means connecting each of said core wire and the lead to a different one of said terminals, a flexible sheath of heat resistant electrical insulating material surrounding said body of insulating material and extending from said connector to beyond the opposite end of said body of insulating material, and said connector comprising a clamp clamping said sheath and said body of insulating material and core wire tightly together and to said connector, there being a sheath of electrical insulating material enclosing said lead and the end of the resistance wire clamped thereto to prevent contact thereof with the projecting end of the core wire leading to said connector.

6. An electric heating cord comprising; an elongated cylindrical body of heat resistant electrical insulating material, said body being flexible and resilient, an electric resistance wire wound spirally about said body of insulating material from one end thereof to the other and slightly imbedded in the said material so as to be supported by the material against shifting thereon, a central core wire of good electrical conductivity and of substantially greater cross sectional area than said resistance wire extending through said body of insulating material from end to end, means clamping the wires together at one end of said body of insulating material, a conductive lead of substantial cross section clamped to the resistance wire at the opposite end, an electrical connector having two terminals, means connecting each of said core wire and the lead to a different one of said terminals, a flexible sheath of heat resistant electrical insulating material surrounding said body of insulating material and extending from said connector to beyond the opposite end of said body of insulating material, and said connector comprising a clamp clamping said sheath and said body of insulating material and core wire tightly together and to said connector, there being a sheath of electrical insulating material enclosing said lead and the end of the resistance wire clamped thereto to prevent contact thereof with the projecting end of the core wire leading to said connector, said body of insulating material comprising a tubular braided element made up of fibers selected from the class of refractory fibers that includes asbestos, quartz and glass.

References Cited in the file of this patent

UNITED STATES PATENTS

| | | |
|---|---|---|
| 1,366,600 | Schwagermann | Jan. 25, 1921 |
| 1,442,648 | Carter | Jan. 16, 1923 |
| 2,529,914 | Challenner | Nov. 14, 1950 |
| 2,610,286 | Cox | Sept. 9, 1952 |
| 2,750,571 | Schmier | June 12, 1956 |

FOREIGN PATENTS

| | | |
|---|---|---|
| 743,032 | Great Britain | Jan. 4, 1956 |